United States Patent
Feng et al.

(10) Patent No.: US 10,281,338 B2
(45) Date of Patent: May 7, 2019

(54) OIL-IMMERSED TRANSFORMER THERMAL MONITORING AND PREDICTION SYSTEM

(71) Applicant: ABB Inc., Cary, NC (US)

(72) Inventors: Xianyong Feng, Cary, NC (US); Mirrasoul J. Mousavi, Cary, NC (US)

(73) Assignee: ABB Inc.DE (US)

( * ) Notice: Subject to any disclaimer, the term of this patent is extended or adjusted under 35 U.S.C. 154(b) by 365 days.

(21) Appl. No.: 15/050,538

(22) Filed: Feb. 23, 2016

(65) Prior Publication Data

US 2016/0252401 A1 Sep. 1, 2016

Related U.S. Application Data

(63) Continuation of application No. PCT/US2014/052218, filed on Aug. 22, 2014.

(60) Provisional application No. 61/869,375, filed on Aug. 23, 2013.

(51) Int. Cl.
| | |
|---|---|
| *G01K 1/20* | (2006.01) |
| *G01K 7/42* | (2006.01) |
| *H02H 6/00* | (2006.01) |
| *H02H 7/04* | (2006.01) |
| *H01F 27/40* | (2006.01) |

(52) U.S. Cl.
CPC .............. *G01K 1/20* (2013.01); *G01K 7/427* (2013.01); *H02H 6/00* (2013.01); *H02H 7/04* (2013.01); *H01F 2027/406* (2013.01)

(58) Field of Classification Search
CPC ............ G01K 7/427; G01K 1/20; H02H 6/00; H02H 7/04; H01F 2027/406
See application file for complete search history.

(56) References Cited

U.S. PATENT DOCUMENTS

| | | | |
|---|---|---|---|
| 6,424,266 B1 | 7/2002 | Weekes et al. | |
| 6,727,821 B2 | 4/2004 | Weekes et al. | |
| 2009/0125150 A1* | 5/2009 | Lifson ..................... | F24D 12/02 700/278 |
| 2012/0280834 A1* | 11/2012 | Schechter .......... | H05K 7/20836 340/870.02 |
| 2013/0158897 A1* | 6/2013 | Jain ...................... | G01R 31/027 702/42 |

FOREIGN PATENT DOCUMENTS

CN 103245857 A 8/2013

OTHER PUBLICATIONS

Guo . Publication No. CN103245857 A. Publication date Aug 14, 2013, Google Translation.*

(Continued)

*Primary Examiner* — Yoshihisa Ishizuka
(74) *Attorney, Agent, or Firm* — Taft, Stettinius & Hollister LLP; J. Bruce Schelkopf

(57) ABSTRACT

A real time thermal monitoring and prediction system (TMPS) is provided for use in monitoring and operating a transformer. The TMPS may be used to estimate a maximum loading level for the transformer over a future time period using a dynamic thermal model for the transformer and ambient temperature forecasts. The transformer may be loaded to its maximum loading level during power congestion or a service restoration process.

19 Claims, 6 Drawing Sheets

(56) References Cited

OTHER PUBLICATIONS

International Search Report, PCT/US2014/052218, ABB Inc., dated Dec. 19, 2014.
Written Opinion, PCT/US2014/052218, ABB Inc., dated Dec. 19, 2014.
Power Transmforrners—Loading Guide for Oil-Immersed Power Transformers IEC 60076-7, first edition, 2005.
IEEE Guide for Loading Mineral-Oil-Immersed Transformer, IEEE Standard C57.91/1995, Jun. 1995.
Susa, et al., Dynamic thermal modelling of power transformers, IEEE Trans. Power Delivery, vol. 25, No. 1, pp. 197-204, Jan. 2005.
Susa, Dynamic Thermal Modelling of Power Transformers, Ph.D. dissertation, Dept. Electrical and Communications Engineering, Helsinki University of Technology, Finland, 2005.
Swift, et al., A fundamental approach to transformer thermal modeling—part I: theory and equivalent circuit; IEEE Trans. Power Delivery, vol. 16, No. 2, pp. II 171-175, Apr. 2001.
Swift, et al., A fundamental approach to transformer thermal modeling—part II: field verification, IEEE Trans. Power. Delivery, vol. 16, No. 2, pp. II 176-180, Apr. 2001.
615 series ANSI Technical Manual, RET615, Production Version 4, Revision C, ABB, 2011.
Thompson, Modern Solutions Power System Conference, Jun. 6, 2012.
Nordam, et al., Temperature responses to step changes in the load current of power transformers, IEEE Trans. Power Delivery, vol. 18, No. 4, pp. 1110-1117, Oct. 2003.
Kane, Waterboarding your transformer—how to obtain the secrets your transformer is keeping, Dynamic Ratings, Inc.

* cited by examiner

OIL-IMMERSED TRANSFORMER THERMAL MONITORING AND PREDICTION SYSTEM

STATEMENT REGARDING FEDERALLY SPONSORED RESEARCH OR DEVELOPMENT

This invention was made with Government support under Assistance Agreement Award No. DE-OE0000547 awarded by DOE. The Government has certain rights in this invention.

BACKGROUND OF THE INVENTION

Transformer thermal overloading is likely to occur during peak hours, emergency conditions, and/or during service restoration process. Transformer overloading over time accelerates insulation deterioration and may result in premature failures. The winding hot-spot temperature and the top-oil temperature are two important factors indicating the thermal condition of oil-immersed transformers. These two temperatures should be carefully monitored to mitigate the adverse effects of thermal overloading in the midst of rising load dynamics and variability in generation and demand.

Existing state-of-the-art methods determine the transformer steady-state rating based on conservative assumptions, disregarding the actual ambient temperature changes over time. This results in inaccurate estimation of the rating and under/over utilization of the transformer depending upon the actual ambient temperature. Existing practices for transformer overload monitoring rely on past and present current measurements and are not predictive in nature. Existing methods also do not account for the transformer oil and winding thermal inertia for dynamic rating estimation.

SUMMARY OF THE INVENTION

In accordance with the present invention, a method is provided for monitoring and operating an oil-filled transformer having a winding. In accordance with the method, initial values for a top-oil temperature and a winding hot-spot temperature of the transformer are calculated using received values of the winding current and ambient temperature. A simulation current for the winding is then set to a maximum value. Starting with the initial values for the top-oil temperature and the winding hot-spot temperature, updated values for the top-oil temperature and the winding hot-spot temperature for a simulation time are recursively calculated using the simulation current and a forecast of future ambient temperatures. The simulation time is the lesser of a forecast period and the time at which the calculated updated value of the top-oil temperature exceeds a maximum top-oil temperature or the calculated updated value of the winding hot-spot temperature exceeds a maximum winding hot-spot temperature. The simulation time and the simulation current are recorded and then the simulation current is decremented. Updated values for the top-oil temperature and the winding hot-spot temperature are then recalculated for another simulation time using the decremented current. This procedure is repeated until the simulation current is a minimum value. Using the recorded simulation currents and the recorded simulation times, a loadability function is created for determining a maximum loading level at any given time during the forecast period. The loadability function is used to operate the transformer during the forecast period.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
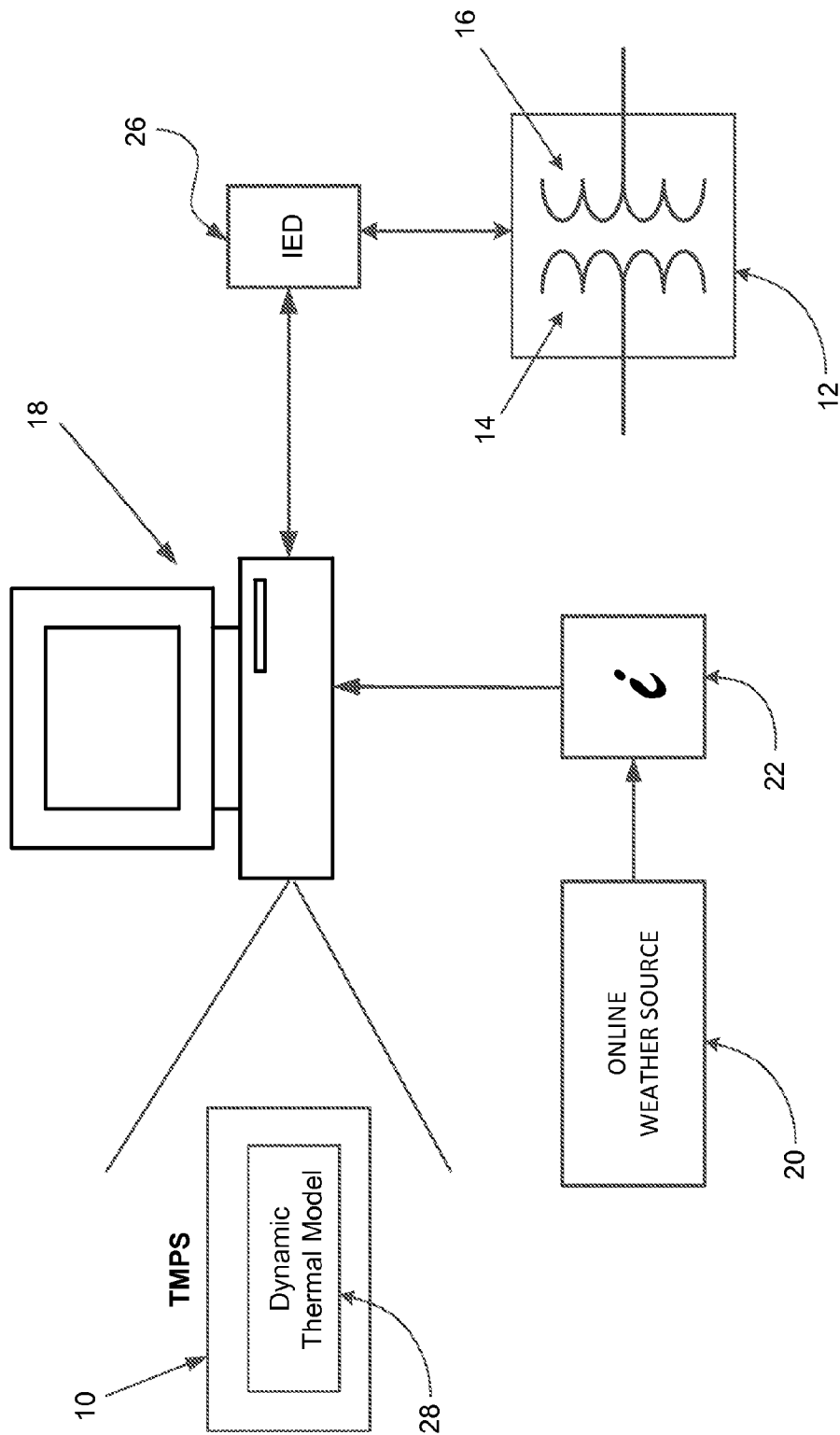
FIG. 1 shows a schematic implementation of a thermal monitoring and prediction system (TMPS) of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown an implementation of a thermal monitoring and prediction system (TMPS) 10 for an oil-immersed transformer 12 having a primary winding 14 and a secondary winding 16. The TMPS 10 is a software system that may be implemented in any layer of the control hierarchy. In one embodiment, the TMPS 10 is implemented in a substation computer 18, such as an ABB COM600. More specifically, the TMPS 10 is stored in memory of the substation computer 18 and is executed by a processor of the substation computer 18. The current (real-time) and forecasted ambient temperatures are inputs to the TMPS 10. The forecasted ambient temperature may be obtained from a weather forecast of an online weather source 20 on the Internet 22 or from another source. The current ambient temperature may be obtained from the online weather source 20 or from one or more temperature sensors located in the vicinity of the transformer 12. The load forecast is another input and can be obtained from a transformer load forecast application running on the substation computer 18 or from a control center or another source. The update time interval for the ambient temperature and load forecast is user configurable and may be preferably set in minutes. As used herein, the term ambient temperature means the temperature in the vicinity of the transformer 12, namely 10 miles or less, more preferably 5 miles or less, still more preferably 1 mile or less.

The TMPS 10 utilizes the primary or secondary winding RMS current of the transformer 12 as another input. The RMS value may be obtained from an intelligent electronic device (IED) 26 in the field or from another sensor system. The user specifies whether to use the primary or secondary winding current of the transformer 12. Substation current transformers typically measure both winding currents and send the measured data to an IED 26. The TMPS 10 requires only one of the two measurements. The current ambient temperature used by the TMPS 10 may also be obtained from the IED 26, which, in turn, obtains it from temperature sensors associated with the IED 26 or connected to the IED 26. Alternately, the ambient temperature may be obtained from an online weather forecast source, as set forth above. The update time interval for these real-time measurements may be on the order of seconds and is user configurable. The real-time data from sensors are transmitted to the substation computer 18 through a wired or wireless communication link or may be directly provided from digital sensors.

Figure 2:
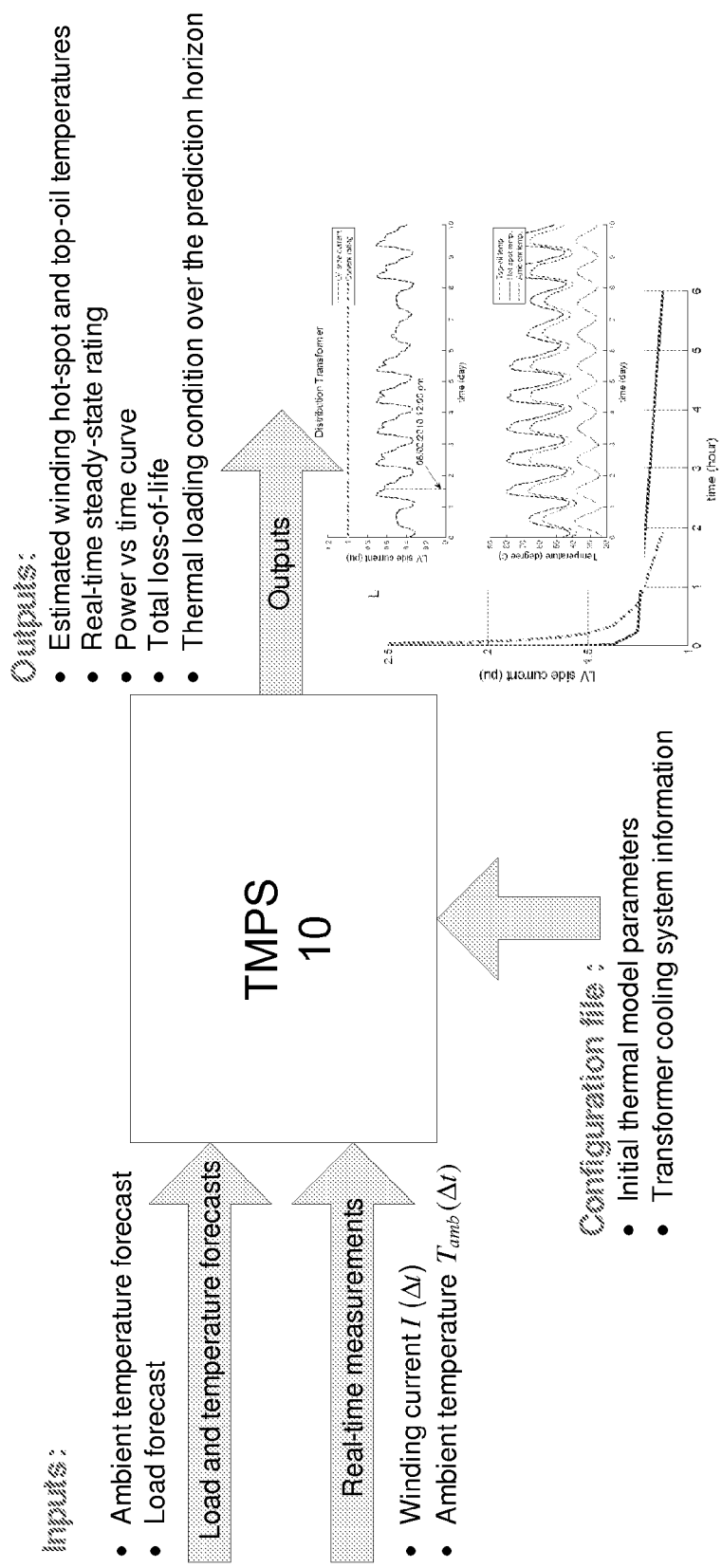
FIG. 2 shows a schematic diagram of the TMPS.

A schematic diagram of the TMPS 10 is shown in FIG. 2. Inputs to the TMPS 10 include: (1.) the forecasted and current ambient temperatures, (2.) transformer load forecast, and (3.) transformer winding current (either primary or secondary side) measurement I(Δt). Outputs of the TMPS 10 include: (1.) the estimated winding hot-spot and top-oil temperatures, (2.) the real-time steady-state rating, (3.) the power vs time curve, (4.) the total loss-of-life, and (5.) the thermal loading condition over the prediction horizon e.g., in the next 12-24 hours. A configuration file stored in memory of the substation computer 18 may be set up to hold thermal model parameters and user settings.

Load forecasts for the transformer 12 for different time periods may be available and may be user-selectable. In this manner, if a transformer load forecast over a desired time horizon e.g., the next 12-24 hours is available, the transformer thermal loading condition in the next 12-24 hours can be evaluated, thereby providing the ability to foresee thermal overload conditions in the near future.

The TMPS 10 includes a dynamic thermal model 28 of the transformer 12. The dynamic thermal model 28 generally includes a top-oil temperature model and a (winding) hot-spot temperature model. The dynamic thermal model 28 provides estimates of the winding hot-spot temperature and the top-oil temperature using the ambient temperature and the winding current either primary or secondary as inputs. A real-time steady-state rating is calculated using the real-time ambient temperature and a steady-state thermal model of the transformer 12. The power vs time curve is estimated using the estimated hot-spot and top-oil temperatures and the transformer dynamic thermal model. The total loss-of-life of the transformer 12 is calculated using the estimated winding hot-spot temperature.

Generally, the dynamic thermal model 28 is expressed as:

Top-oil temperature model: $\dot{\theta}_{top\text{-}oil}(t) = f(\theta_{top\text{-}oil}(t), \theta_{amb}(t), I(t), X)$ Hot-spot temperature model: $\dot{\theta}_{hot\text{-}spot}(t) = g(\theta_{hot\text{-}spot}(t), \theta_{top\text{-}oil}(t), I(t), X)$ where, X is the parameter vector of the thermal model, which includes time constants of oil and windings, oil and winding exponents, rated top-oil and hot-spot temperature rises, rated top-oil and hot-spot temperatures, and other coefficients.

More specifically, the dynamic thermal model 28 may be one of first, second and third models described below. The first model is:

$$k_{11}\tau_{oil,rated}\frac{d\theta_{top\text{-}oil}}{dt} = \left(\frac{1+R \cdot K^2}{1+R}\right)^x \cdot \Delta\theta_{top\text{-}oil,rated} - (\theta_{top\text{-}oil} - \theta_{amb})$$

$$\Delta\theta_{hot\text{-}spot} = \Delta\theta_{hot\text{-}spot1} - \Delta\theta_{hot\text{-}spot2}$$

$$k_{22}\tau_{wndl,rated}\frac{d\Delta\theta_{hot\text{-}spot1}}{dt} = k_{21} \cdot K^y \cdot \Delta\theta_{hot\text{-}spot,rated} - \Delta\theta_{hot\text{-}spot1}$$

$$\tau_{oil,rated}/k_{22}\frac{d\Delta\theta_{hot\text{-}spot2}}{dt} = (k_{21}-1) \cdot K^y \cdot \Delta\theta_{hot\text{-}spot,rated} - \Delta\theta_{hot\text{-}spot2}$$

$$\theta_{hot\text{-}spot} = \theta_{top\text{-}oil} + \Delta\theta_{hot\text{-}spot}$$

$$K = I(t)/I_{rated}$$

where, t is the time variable, $k_{11}$, $k_{21}$, and $k_{22}$ are coefficients of the thermal model; $\tau_{oil,rated}$ and $\tau_{wnd,rated}$ are the rated oil and winding time constants; $\theta_{amb}$, $\theta_{top\text{-}oil}$ and $\theta_{hot\text{-}spot}$ are ambient, top-oil and hot-spot temperatures, respectively; x and y are the oil and winding exponents; $\Delta\theta_{top\text{-}oil,rated}$ is the rated top-oil temperature rise over ambient temperature; K is the load factor; I(t) is the winding current; $I_{rated}$ is the rated current of the transformer; and R is the ratio of load losses at rated current to no-load losses.

The second model is:

$$\tau_{oil,rated}\frac{d\theta_{top\text{-}oil}}{dt} = \left(\frac{1+R \cdot K^2}{1+R}\right)^n \cdot \Delta\theta_{top\text{-}oil,rated} - (\theta_{top\text{-}oil} - \theta_{amb})$$

$$\tau_{wnd,rated}\frac{d\theta_{hot\text{-}spot}}{dt} = \left(\frac{1+R \cdot K^2}{1+R}\right)^m \cdot \Delta\theta_{hot\text{-}spot,rated} - (\theta_{hot\text{-}spot} - \theta_{top\text{-}oil})$$

where, n and m are the oil and winding exponents; and $\Delta\theta_{hot\text{-}spot,rated}$ is the rated hot-spot temperature rise over top-oil temperature.

The third model is:

$$\tau_{oil,rated} \cdot \frac{d\theta_{top\text{-}oil}}{dt} = \frac{1+R \cdot K^2}{1+R} \cdot \Delta\theta_{top\text{-}oil,rated} - \frac{(\theta_{top\text{-}oil} - \theta_{amb})^{n_1+1}}{\mu_{pu}^{n_1} \cdot \Delta\theta_{top\text{-}oil,rated}^{n_1}}$$

$$\tau_{wnd,rated} \cdot$$

$$\frac{d\theta_{hot\text{-}spot}}{dt} = [K^2 \cdot P_{cu,pu}(\theta_{hot\text{-}spot})] \cdot \Delta\theta_{hot\text{-}spot,rated} - \frac{(\theta_{hot\text{-}spot} - \theta_{top\text{-}oil})}{\mu_{pu}^{n_2} \cdot \Delta\theta_{hot\text{-}spot,rated}^{n_2}}$$

$$\mu = \mu_{rated}\mu_{pu}$$

$$\mu = 0.0000013573 \cdot \exp\left[\frac{2797.3}{\theta_{top\text{-}oil} + 273}\right]$$

$$\mu_{rated} = 0.0000013573 \cdot \exp\left[\frac{2797.3}{\theta_{top\text{-}oil,rated} + 273}\right]$$

$$P_{cu,pu}(\theta_{hot\text{-}spot}) =$$

$$\frac{P_w}{P_w + P_E} \cdot \frac{\theta_r + \theta_{hot\text{-}spot}}{\theta_r + \theta_{hot\text{-}spot,rated}} + \frac{P_E}{P_w + P_E} \cdot \frac{\theta_r + \theta_{hot\text{-}spot,rated}}{\theta_r + \theta_{hot\text{-}spot}}$$

where, $n_1$ and $n_2$ are the oil and winding exponents; $P_w$ and $P_E$ are DC and eddy losses; $\theta_{hot\text{-}spot,rated}$ is the rated hot-spot temperature; and $\theta_r$ may be chosen as 234 for copper, 228 for aluminum.

The accuracy of the third model is typically higher than the first and second models. All three models may be stored in the memory of the substation computer 18 and made available for use by the TMPS 10. More specifically, a user may select one of the three models for use as the dynamic thermal model 28 of the TMPS 10. Such selection may be performed through a user interface of the substation computer 18. Further, the TMPS 10 may permit a user to define its own models and store them in the memory of the substation computer 18 for later use as the dynamic thermal model 28.

Existing state-of-the-art methods usually determine the transformer steady-state rating based on conservative assumptions disregarding the actual ambient temperature changes over time. This results in inaccurate estimation of the rating and under or over utilization of the transformer. For example, a fixed ambient temperature such as 40° C. may be used to calculate the conservative steady-state rating of the transformer in certain regions. However, the ambient temperature does vary and may span from −15 to 45° C. during the year. When the actual ambient temperature is below the set value, the actual steady-state rating is higher than the conservative rating; when the ambient temperature is higher than the constant set value, the actual steady-state rating is lower than the conservative rating. Using the conservative rating, the transformer is either underutilized when the ambient temperature is below the set value or it may be operating in an unsafe region when the ambient temperature is over the set value. In contrast to the conventional method, the TMPS 10 of the present inventions provides a real-time steady-state rating estimation using the real-time ambient temperature. In this manner, the TMPS 10 permits the transformer 12 to be more safely and optimally operated.

The real-time steady-state rating of the transformer 12 may be estimated using the current actual ambient temperature and the following steady state transformer thermal model expressed in general terms.

$$f(\theta_{top-oil}(t), \theta_{amb}(t), I(t), X) = 0$$

$$g(\theta_{top-oil}(t), \theta_{hot-spot}(t), I(t), X) = 0$$

$$\theta_{hot-spot}(t) = \theta_{hot-spot}{}^{max}, \theta_{amb}(t) = \theta_{amb}{}^{current}$$

Figure 3:
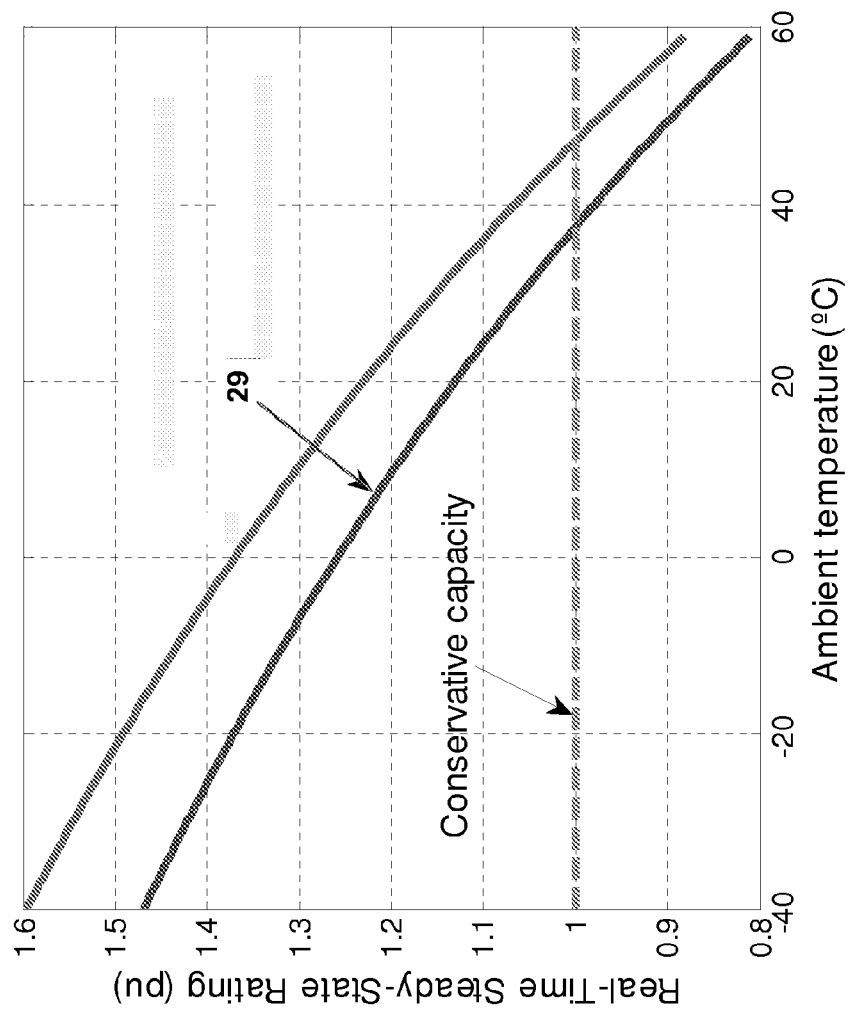
FIG. 3 shows a plot of the real time steady state rating of two transformers versus ambient temperature.

Since the steady-state transformer thermal model is characterized by a group of nonlinear equations, the real-time steady-state rating employs the Newton method. The real-time steady-state rating is an inverse function of the ambient temperature as depicted in the representative plots of FIG. 3. As shown, the real-time steady-state rating 29 of the transformer 12 decreases as the ambient temperature increases. When the ambient temperature is high, the real-time steady-state rating is close to the conservative rating; when the ambient temperature is low, the real-time steady-state rating may be much higher than the conservative rating as practiced today. This allows the operators to intelligently overload the transformer 12 for a brief period of time when needed to relieve congestion or avoid brown-outs and black-outs during emergencies.

Conventional methods for transformer overload monitoring rely on past and present current measurements and are not predictive in nature. In contrast, the TMPS 10 of the present invention uses load and ambient temperature forecasts to predict a transformer thermal overload condition.

Figure 4:
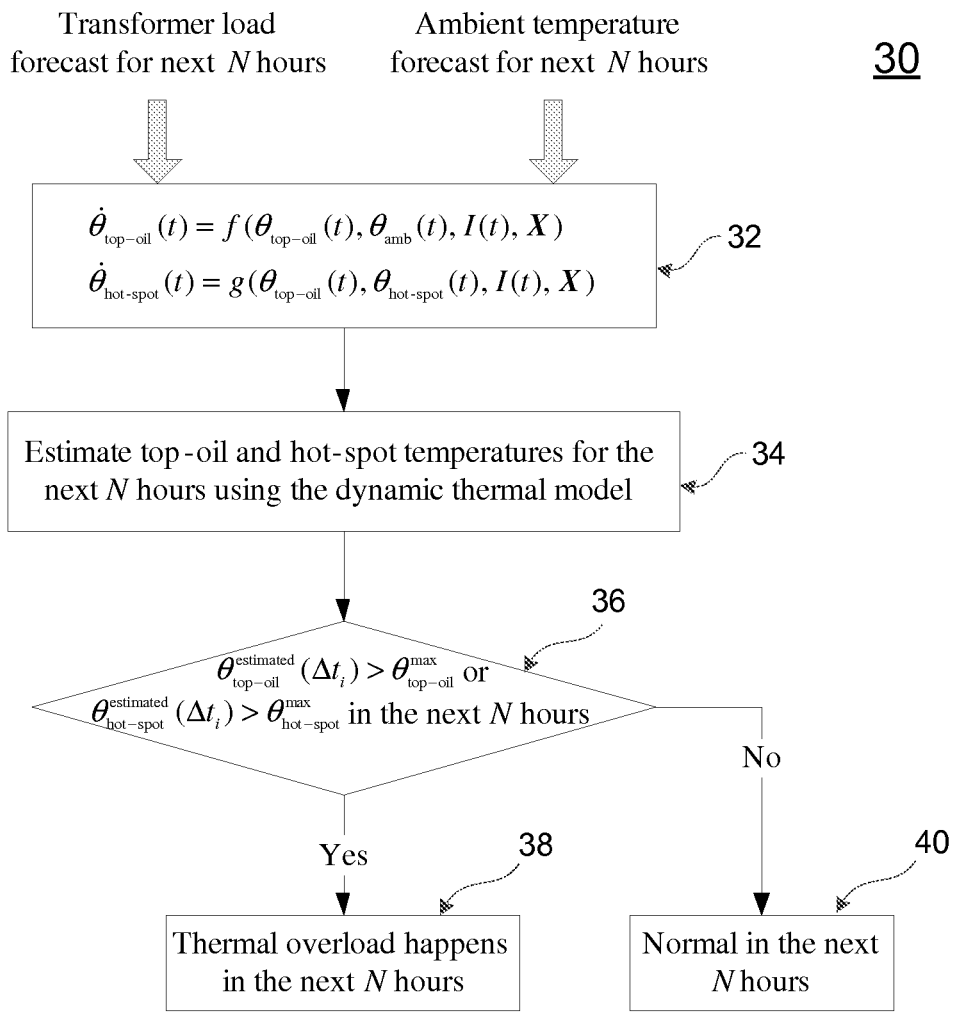
FIG. 4 shows a flow chart for a method of predicting thermal overload of the transformer.

Using transformer load and ambient temperature forecasts, the TMPS 10 is operable to perform a method 30 for predicting whether a thermal overload will occur in a prediction horizon of N hours. The prediction horizon may be selected by an operator through the user interface of the substation computer 18. The method 30 is schematically shown in FIG. 4. In step 32 of the method 30, transformer load (winding current) and ambient temperature forecasts for N hours are input into the dynamic thermal model 28. In step 34, the results from step 32 are analyzed to estimate top-oil and winding hot-spot temperatures for the prediction horizon (N hours). In step 36, the estimated top-oil and winding hot-spot temperatures are compared to maximum allowed values ($\theta_{top-oil}{}^{max}$ or $\theta_{hot-spot}{}^{max}$). If the estimated top-oil temperature exceeds $\theta_{top-oil}{}^{max}$ or the estimated winding hot-spot temperature exceeds $\theta_{hot-spot}{}^{max}$, an alarm warning an operator that the transformer 12 is expected to experience a thermal overload in the next N hours is generated in step 38. Such an alarm will permit the operator to initiate mitigation actions such as shedding non-critical loads or reconfiguring the system before a real overload happens. The alarm may be a visual alarm displayed on the user interface of the substation computer 18. If the estimated top-oil temperature does not exceed $\theta_{top-oil}{}^{max}$ and the estimated winding hot-spot temperature does not exceed $\theta_{hot-spot}{}^{max}$, a warning alarm is not generated. However, the operator may be provided with a notification in step 40 that the transformer 12 is not expected to experience a thermal overload in the next N hours. In method 30, the dynamic thermal model 28 is run using the improved Euler method (Mid-point method).

Existing systems and methods for dynamic rating estimation do not account for the transformer oil and winding thermal inertia (which is their resistance to temperature change due to their thermal conductivity and thermal capacity). The TMPS 10, however, performs a dynamic rating prediction method 50 which uses real-time and forecast loading and ambient temperature data, coupled with the dynamic thermal model 28 to predict a dynamic rating for the transformer 12 in operational real time. The dynamic rating prediction method 50 helps push the transformer loading level when congestion occurs for a set period of time. More specifically, the dynamic rating prediction method 50 leverages the thermal inertia of the transformer 12 to allow for increased loading for a short period of time, limited by the time constants of the thermal inertia.

Figure 5:
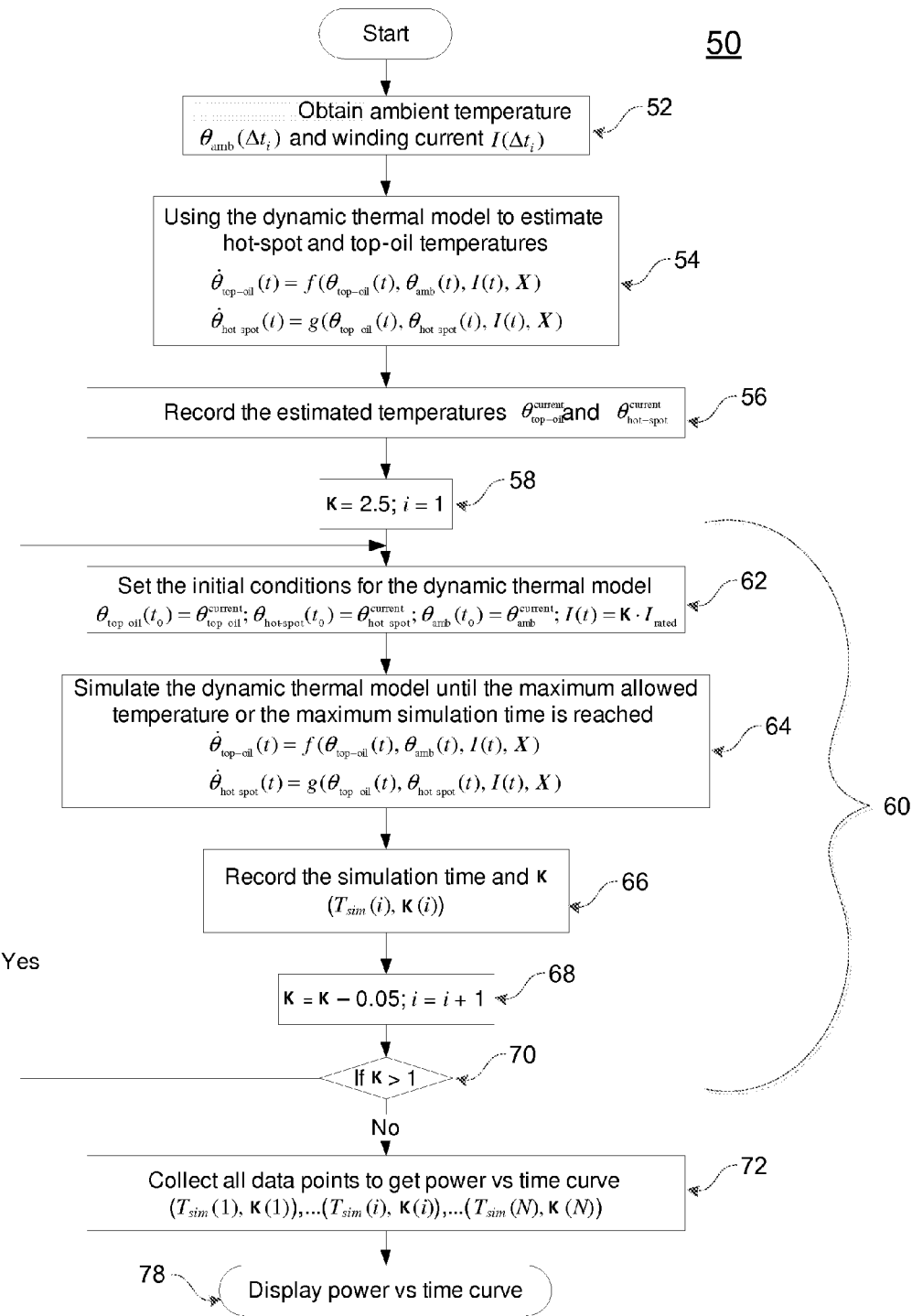
FIG. 5 shows a flow chart of a dynamic rating prediction method for the transformer.

A flow chart of the dynamic rating prediction method 50 is shown in FIG. 5. In step 52 of the method 50, the ambient temperature $\theta_{amb}(\Delta t_i)$ and winding current $I(\Delta t_i)$ are obtained and input into the dynamic thermal model 28. The ambient temperature $\theta_{amb}(\Delta t_i)$ and winding current $I(\Delta t_i)$ can be real-time measured values or can be forecasted values. In step 54, the current winding hot-spot and top-oil temperatures are estimated (calculated) using the dynamic thermal model 28 and the inputted data. The estimated current temperatures are recorded and displayed on the user interface of the substation computer 18 in step 56. In step 58, initial values for an iteration number i and the load factor K are initialized for a dynamic rating calculation loop 60. Typical initial values for i and K may be chosen as 1 and 2.5, respectively, or other values may be specified by an operator through the user interface of the substation computer 18. The calculation loop 60 begins in step 62 with the initial setting of the values for the variables in the dynamic thermal model 28. The initial hot-spot and top-oil temperatures are set as the current estimated temperatures; the initial ambient temperature is set as the current ambient temperature; the winding current is set as K times the rated current. In step 64, the dynamic thermal model 28 is run to determine estimated winding hot-spot and top-oil temperatures for a forecast period. As the dynamic thermal model 28 runs, the values for the ambient temperature for the forecast period are obtained from an ambient temperature forecast from the online weather source, or another source, as described earlier; otherwise, a constant current ambient temperature is used. The dynamic thermal model 28 is allowed to run in step 64 until a maximum simulation time (equal to the duration of the forecast period) or a maximum allowed temperature (hot-spot or top-oil) is reached. The forecast period and maximum allowed hot-spot and top-oil temperatures can be specified by the user through the user interface of the substation computer 18 (or use default values such as the next 4 hours for the forecast period and 120/105° C. for maximum winding hot-spot/top-oil temperatures). Once the maximum simulation time or a maximum allowed temperature is reached, the method 50 proceeds to step 66 wherein the load factor K(i) and total simulation time $T_{sim}(i)$ are recorded (stored) as a two dimensional data point (K(i), $T_{sim}(i)$). The method 50 then proceeds to step 68, wherein the iteration number i and load factor K are updated. More specifically, the iteration factor is increased by 1 and the load factor K is decremented by an amount, such as 0.05. Next, in step 70, a determination is made whether the calculation loop 60 should continue or stop. If K is greater than 1, the method 50 proceeds back to step 62 and a new iteration of the calculation loop 60 starts. If K is not greater than 1, the calculation loop 60 stops and the method proceeds to step 72, wherein all data points ($T_{sim}(1)$, K(1)), . . . ($T_{sim}(i)$, K(i)), . . . ($T_{sim}(N)$, K(N)) are collected and used to generate a power vs time curve 76. The curve 76 is displayed on the user interface of the substation computer 18 in step 78. The method 50 may be continuously repeated so as to have the curve 76 updated in real-time as new data (actual measured or forecast winding current and temperature measurements) become available. More specifically, the forecast period may be shifted forward by an incremental amount of time (which may be operator-selectable) and then the method 50 may be re-performed. This shifting of the forecast period and re-performance of the method 50 may be continuously performed throughout a day or more.

The curve 76 may be used to control the loading (winding current) of the transformer 12. For example, the transformer 12 may be controlled so as to operate intermittently or continuously just below the curve 76 (i.e., the maximum loading level). The control may be performed by connecting and disconnecting loads to and from the transformer 12, either by an operator or automatically by a control program running on the substation computer 18 or another computer.

Figure 6:
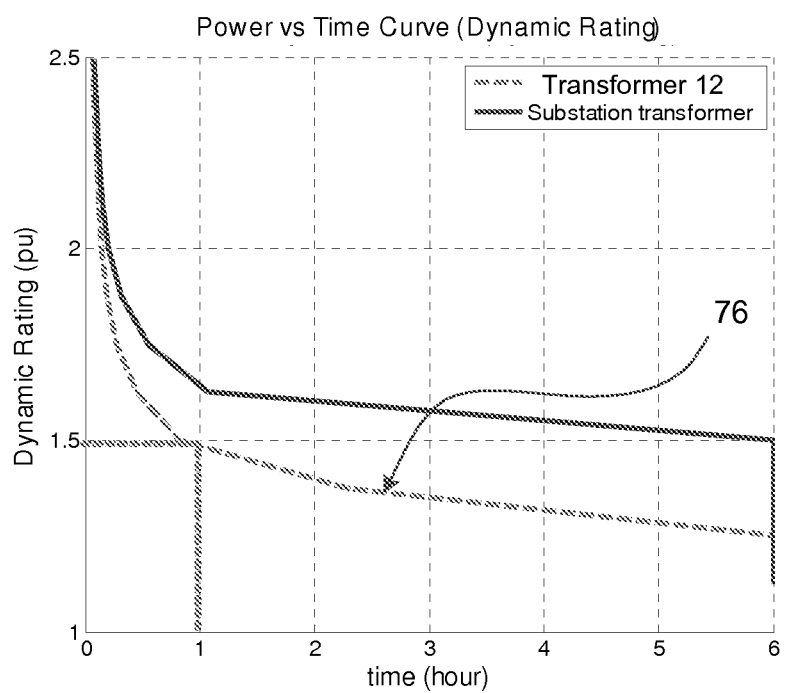
FIG. 6 shows a power versus time curve produced by the dynamic rating prediction method for the transformer.

The curve 76 produced by the dynamic rating prediction method 50 is shown in FIG. 6. The maximum loadability of the transformer 12 and a substation transformer are predicted for a time period of six hours. In each transformer, when the winding current is increased, the top-oil and winding hot-spot temperatures take some time to reach the steady-state values due to the intrinsic thermal inertia. Thus, the transformers can be overloaded for a short period of time before the winding hot-spot temperature or the top-oil temperature reaches the maximum allowed value. For example, the transformer 12 in FIG. 6 can carry 1.5 times of the rated current for 1 hour without violating the thermal constraints.

Existing conventional methods do not estimate the transformer total loss-of-life in real-time. Historical data is usually used in the estimation. In the TMPS 10, however, the total loss-of-life of the transformer 12 is calculated using estimated hot-spot temperatures in real-time. The real-time loss-of-life estimation keeps the operator aware of the actual remaining life of the transformer 12.

The TMPS 10 performs a method of estimating percent loss-of-life of the transformer 12 based on IEEE Standard C57.91-1995. The method includes calculating an aging acceleration factor $F_{AA}$ for the transformer 12 using the estimated hot-spot temperature obtained from the dynamic thermal model 28. The hot-spot temperature and, thus, the aging acceleration factor and the percent of loss-of-life are updated in operational real time, i.e., continuously calculated using real time ambient temperatures obtained from the online weather source or ambient temperature sensors and real time winding current data from the IED 26. The aging acceleration factor $F_{AA}$ is calculated using the expression:

$$F_{AA} = \exp\left[\frac{1500}{110+273} - \frac{1500}{\theta_{hot-spot}^{estimated}(\Delta t_i)+273}\right]$$

where, $\theta_{hot-spot}^{estimated}(\Delta t_i)$ is the estimated hot-spot temperature of the transformer 12; and $\Delta t_i$ is the decision time step.

The aging acceleration factor $F_{AA}$ will have a value of 1.0 for continuous operation of the transformer 12 at 110° C. For operation of the transformer above 110° C., the aging acceleration factor is greater than one, indicating accelerated aging.

Using the aging acceleration factor $F_{AA}$, the total loss-of-life $T_{total}$ for the total time period N may be calculated using the expression:

$$T_{total} = \Sigma_{i=1}^{N} F_{AA_i} \Delta t_i$$

An equivalent aging factor $F_{eq\,(N)}$ for the total time period N may be calculated using the expression:

$$F_{eq}(N) = \frac{\sum_{i=1}^{N} F_{AA_i} \Delta t_i}{\sum_{i=1}^{N} \Delta t_i}$$

Using the equivalent aging factor $F_{eq\,(N)}$, transformer percent loss-of-life may be calculated using the expression:

$$\text{percent loss-of-life} = \frac{F_{eq}(N) \cdot \sum_{i=1}^{N} \Delta t_i}{\text{Normal insulation life}} \cdot 100\%$$

As set forth above, the percent of loss-of-life is continuously updated in operational real time using real time ambient temperature and winding current data.

From the foregoing, it should be appreciated that the TMPS 10 of the present invention performs many beneficial methods. As described above, the TMPS 10 may be used to evaluate the loading condition of the transformer 12 over a future time interval e.g., the next 12-24 hours using load and temperature forecasts. A warning signal may be generated to draw an operator's attention to initiate mitigation actions such as shedding non-critical loads or reconfiguring the system before an actual overload happens.

The TMPS 10 may also be used to estimate the maximum loading level for the transformer 12 over a future time period e.g., in the next 15 minutes, 1 hour, or 4 hours using the dynamic thermal model 28 and ambient temperature. The transformer 12 may be loaded to its dynamic rating during power congestion or service restoration process. This allows the operators to intelligently overload the transformer.

The TMPS 10 may be used to estimate the total loss-of-life of the transformer 12 in real-time, which may help the operator to aware the actual remaining life of the transformer 12.

The foregoing methods may be selectively performed by the TMPS 10 in response to requests from an operator entered through the user interface of the substation computer 18. Alternately or additionally, one or more the foregoing methods may be automatically performed by the TMPS 10 based on predetermined schedule(s). Further, the methods may be performed at the same time or at different times.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of monitoring and operating an oil-filled transformer having a winding, the method comprising: (a.) receiving a forecast period; (b.) receiving a value of current in the winding; (c.) receiving a value of ambient temperature; (d.) calculating initial values for a top-oil temperature and a winding hot-spot temperature of the transformer using the received values of current in the winding and ambient temperature; (e.) setting a simulation current for the winding of the transformer to a maximum value; (f.) receiving a forecast of future ambient temperatures for the forecast period; (g.) starting with the initial values for the top-oil temperature and the winding hot-spot temperature, recursively calculating updated values for the top-oil temperature and the winding hot-spot temperature of the transformer for a simulation time using the simulation current and the forecast of future ambient temperatures, the simulation time being the lesser of the forecast period and the time at which the calculated updated value of the top-oil temperature exceeds a maximum top-oil temperature or the calculated updated value of the winding hot-spot temperature exceeds a maximum winding hot-spot temperature; (h.) recording the simulation time and the simulation current; (i.) decrementing the simulation current; (j.) repeating steps (g.) through (i.) until the simulation current is a minimum value; (k.) using the recorded simulation currents and the recorded simulation times to create a loadability function for determining a maximum permissible loading level at any given time during the forecast period; (l.) using the loadability function to operate the transformer during the forecast period; and calculating a percent loss-of-life of the transformer using the received values of ambient temperature and winding current data.

2. The method of claim 1, further comprising after step (l.): (m.) updating the forecast period by shifting it forward by a selected amount of time; and (n.) re-performing steps (b.) through (l.) using the updated forecast period as the forecast period.

3. The method of claim 2, further comprising continuously performing steps (m.) and (n.).

4. The method of claim 1, further comprising displaying the loadability function as a curve on a user interface of a computer.

5. The method of claim 1, wherein the step of calculating updated top-oil temperatures and winding hot-spot temperatures comprises a recursive series of steps and is performed using a thermal model having the general expression: g $$\dot{\theta}_{top\text{-}oil}(t) = f(\theta_{top\text{-}oil}(t), \theta_{amb}(t), I(t), X)$$

$$\dot{\theta}_{hot\text{-}spot}(t) = g(\theta_{top\text{-}oil}(t), \theta_{hot\text{-}spot}(t), I(t), X)$$

wherein, $I(t)$ is the simulation current, $X$ is a parameter vector, $\dot{\theta}_{top\text{-}oil}(t)$ at least partially defines the updated value of the top-oil temperature, $\theta_{top\text{-}oil}(t)$ at least partially defines a previous value of the top-oil temperature, $\dot{\theta}_{hot\text{-}spot}$ at least partially defines the updated value of the winding hot-spot temperature and $\theta_{hot\text{-}spot}$ at least partially defines a previous value of the winding hot-spot temperature; and wherein $\theta_{top\text{-}oil}(t)$ is initially set as the initial value of the top oil temperature and $\theta_{hot\text{-}spot}$ is initially set as the initial value of the hot spot temperature.

6. The method of claim 1, wherein the step of receiving the forecast of future ambient temperatures comprises receiving the forecast of future ambient temperatures from a weather source over the Internet.

7. The method of claim 1, wherein the maximum value for the simulation current is selected by an operator through a user interface of a computer.

8. The method of claim 1, wherein the step of receiving the forecast period comprises receiving the forecast period from an operator through a user interface of a computer.

9. The method of claim 1, wherein the method is performed using an electronic device or a transformer protection relay.

10. The method of claim 1, wherein the step of calculating the percent loss-of-life comprises calculating an aging acceleration factor that is a function of the winding hot-spot temperature.

11. The method of claim 10, wherein the step of calculating a percent loss-of-life of the transformer comprises: continuously receiving values of current in the winding; continuously receiving values of ambient temperature; continuously re-calculating values for the winding hot-spot temperature of the transformer using the continuously received values of current in the winding and ambient temperature; continuously re-calculating the aging acceleration factor using the continuously re-calculated values for the winding hot-spot temperature; continuously re-calculating an equivalent aging factor using the continuously re-calculated values of the aging acceleration factor; and continuously re-calculating the percent loss-of-life using the continuously re-calculated values of the equivalent aging factor.

12. The method of claim 11, wherein the step of continuously receiving values of ambient temperature comprises receiving values of ambient temperature from a weather source over the Internet.

13. The method of claim 1, wherein the maximum value for the simulation current is a rated current of the transformer multiplied by a load factor; and wherein the step of decrementing the simulation current comprises decrementing the load factor by a predetermined amount.

14. The method of claim 1, wherein the received value of current in the winding is a forecasted value of current in the winding.

15. The method of claim 14, wherein the received value of ambient temperature is a forecasted value of ambient temperature.

16. The method of claim 1, wherein the received value of current in the winding is a measured value of current in the winding.

17. The method of claim 16, wherein the received value of ambient temperature is a measured value of ambient temperature.

18. The method of claim 1, wherein the winding is a primary winding.

19. The method of claim 1, wherein the winding is a secondary winding.

* * * * *